United States Patent [19]
Welter

[11] Patent Number: 5,556,155
[45] Date of Patent: Sep. 17, 1996

[54] BEARING DEVICE, IN PARTICULAR FOR PIVOTALLY MOUNTED SUN VISORS IN VEHICLES

[75] Inventor: Patrick Welter, La Chambre, France

[73] Assignee: Gebr. Happich GmbH, Germany

[21] Appl. No.: 508,346

[22] Filed: Jul. 27, 1995

[30] Foreign Application Priority Data

Aug. 3, 1994 [DE] Germany .................. 44 27 445.9

[51] Int. Cl.⁶ .................................................. B60J 3/02
[52] U.S. Cl. ............................ 296/97.12; 296/97.9
[58] Field of Search .................... 296/97.9, 97.12, 296/97.13, 97.11

[56] References Cited

U.S. PATENT DOCUMENTS

| | | | |
|---|---|---|---|
| 3,035,864 | 5/1962 | Davidson | 296/97.12 |
| 3,365,232 | 1/1968 | Ballantyne | 296/97.12 |
| 3,472,549 | 10/1969 | Wiesmann | 296/97.9 |
| 3,910,627 | 10/1975 | Meyer | 296/97.12 |
| 4,070,054 | 1/1978 | Cziptschirsch | . |
| 5,004,289 | 4/1991 | Lanser et al. | 296/97.12 |
| 5,409,285 | 4/1995 | Snyder et al. | 296/97.11 |
| 5,455,617 | 10/1995 | Welter | 296/97.9 |

FOREIGN PATENT DOCUMENTS

| | | |
|---|---|---|
| 0207777 | 7/1985 | European Pat. Off. . |
| 4315232 | 5/1993 | Germany . |

*Primary Examiner*—Joseph D. Pape
*Attorney, Agent, or Firm*—Ostrolenk, Faber, Gerb & Soffen, LLP

[57] ABSTRACT

A bearing device for a swivelable sun visor used in a vehicle, wherein the sun visor body is supported by a bearing shaft, one end of which is received in the sun visor body and the other end of which is mounted in the vehicle. The bearing body for the shaft in the sun visor body is molded along with a reinforcement frame embedded in the sun visor body. The bearing body includes a bearing bore defined by two rows of generally semicircularly shaped ribs and the ribs on one side are interleaved with the ribs from the other side to define the bearing opening for the shaft. The bearing shaft inserted in the bearing body includes a groove which receives a U-shaped spring therein which presses against the walls of the groove and is pressed against the insides of the ribs for holding the swivel position of the bearing body and the visor body. The ribs define a radial enlargement and when the shaft and the spring are rotated to urge the spring into the enlargement, the bearing body and the visor body are detented in a selected position.

6 Claims, 4 Drawing Sheets

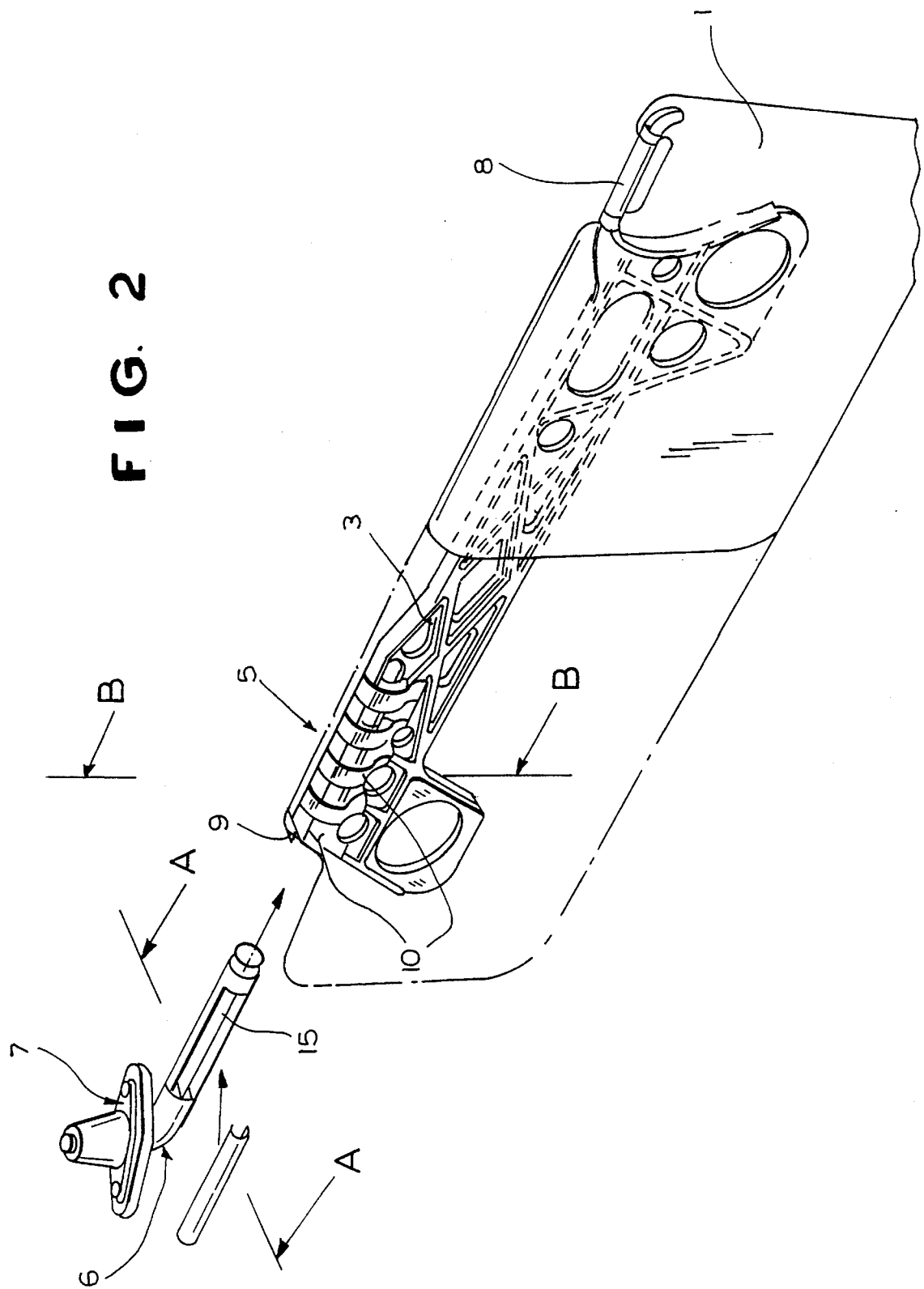

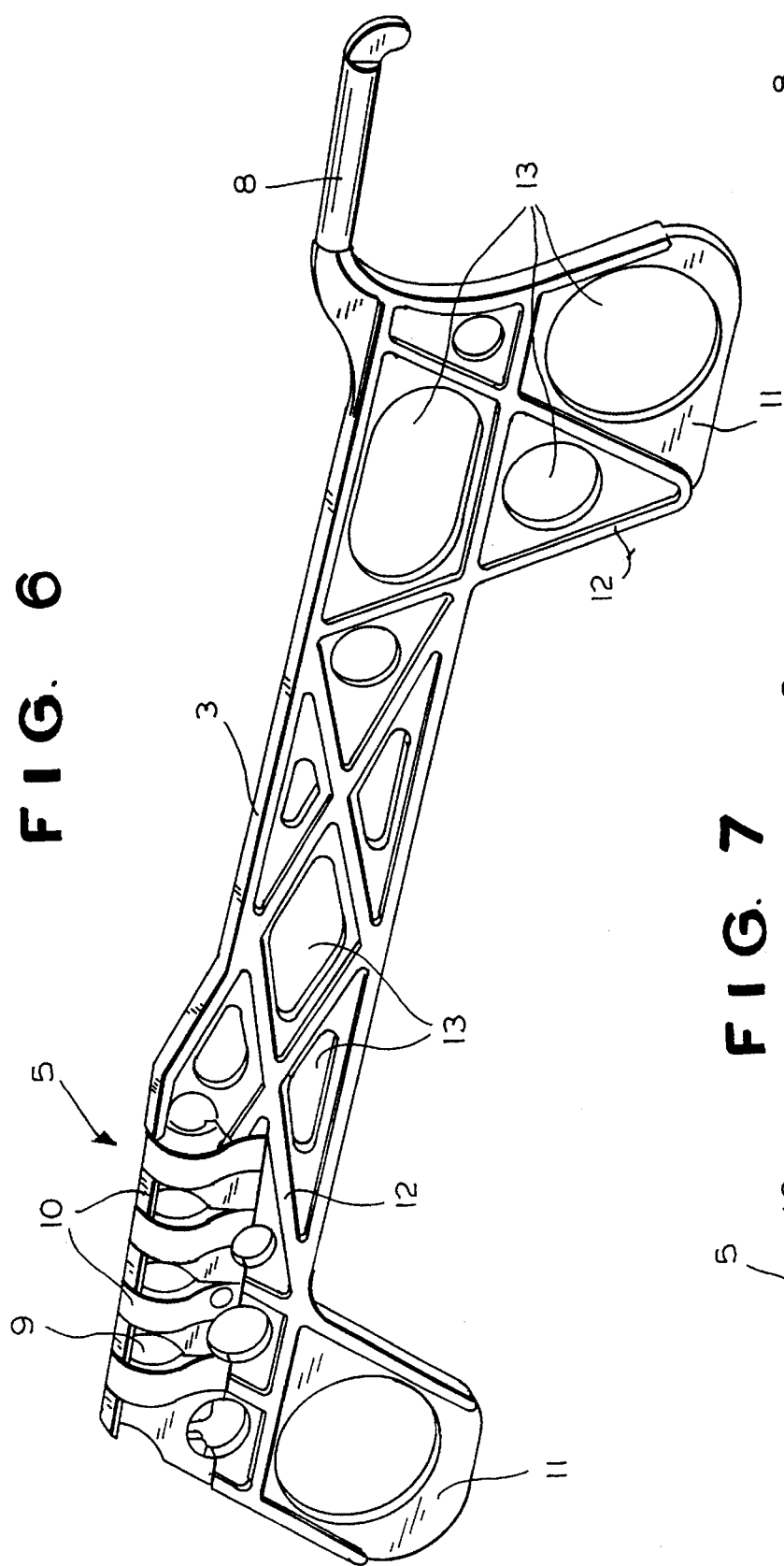
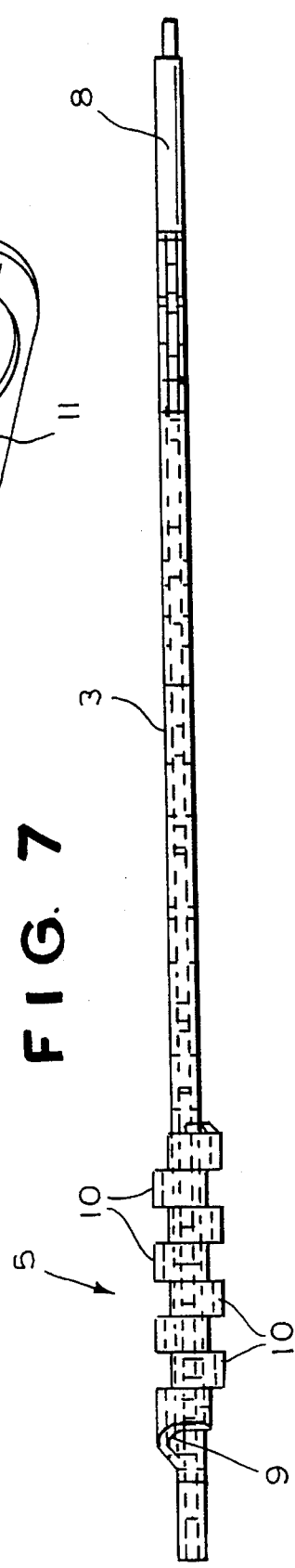
FIG. 6
FIG. 7

BEARING DEVICE, IN PARTICULAR FOR PIVOTALLY MOUNTED SUN VISORS IN VEHICLES

BACKGROUND OF THE INVENTION

The invention concerns a bearing device particularly for pivotally mounted sun visors for use in a vehicle, which sun visor incorporates a shaft. One end section of the shaft can be connected to the vehicle, and the other end section of the shaft is insertable into a bearing body in the sun visor body. The sun visor body can be rotated around the bearing body between first and second limit positions. A detent device including a spring engages the shaft in a frictional connection in at least one position within the rotation range of the sun visor body. Over its adjustment range, the shaft generates a moment which must be overcome to effect rotational adjustment.

DE-25 51 633 C2 shows a bearing for a sun visor body with a leaf spring bent into a U-shape. The shaft of the bearing device is clamped between the legs of the U so that the sun visor body is swivelably supported. To configure a detent device, the shaft is provided with flats with which the legs of the spring are in contact when in their detent position. The spring is relatively large and, in addition, it is relatively work intensive and expensive to manufacture. A particular disadvantage is that the conventional bearing can be removed from the sun visor body only with extremely great effort which is, however, necessary if the individual components in the sun visor are to be recovered for recycling.

SUMMARY OF THE INVENTION

Based on a bearing device of this type, the object of the invention is to prepare the bearing device simply and cost favorably for manufacture, so that it can be mounted trouble free and can be dismantled just as trouble free for the purpose of separating and sorting the individual components by materials.

In the invention, the one piece bearing body is molded onto a reinforcement frame. That frame and the bearing body are an injected molded plastic part which is embedded in the molded sun visor body. A bearing bore with at least one radial, trough shaped extension runs axially through the top edge of the reinforcement frame. The bore is formed by two rows of ribs, wherein each row of ribs includes two or more approximately semicircularly shaped individual ribs arranged in line one next to the other. The ribs are spaced apart such that the ribs in each row of ribs are interleaved into the gaps between the ribs in the other row of ribs. The visor bearing shaft has an end section inserted in the bearing bore. That end section includes a groove that runs axially, has closed ends and has groove defining walls that diverge radially outwardly. A spring of a length corresponding to the groove is inserted under preload in the groove. The spring is manufactured from spring steel sheet with a U-shaped cross section with legs converging toward their free ends and the legs are urged against the groove walls.

The bearing device of the invention comprises only a few parts, is extremely easy and economical to manufacture, is additionally quick and simple to assemble and particularly also to dismantle since in the latter case, only the shaft together with the spring which it holds need be pulled Out of the bearing body. The sun visor body which may be made entirely of plastic material can then be sent for recycling without further action. Forming the bearing body from rows of ribs has the particular advantage that in manufacturing that body and/or the entire reinforcement frame, it is possible to use injection molding tools without complicated pushers.

Other features of the invention are described in further detail on the basis of one embodiment shown in the drawings.

BRIEF DESCRIPTION OF THE DRAWINGS

FIG. 2 shows an exploded perspective view of the sun visor in FIG. 1;

FIG. 6 shows a detail of the sun visor in perspective view; and

FIG. 7 shows a top view of the detail in FIG. 6.

DESCRIPTION OF A PREFERRED EMBODIMENT

Figure 1:
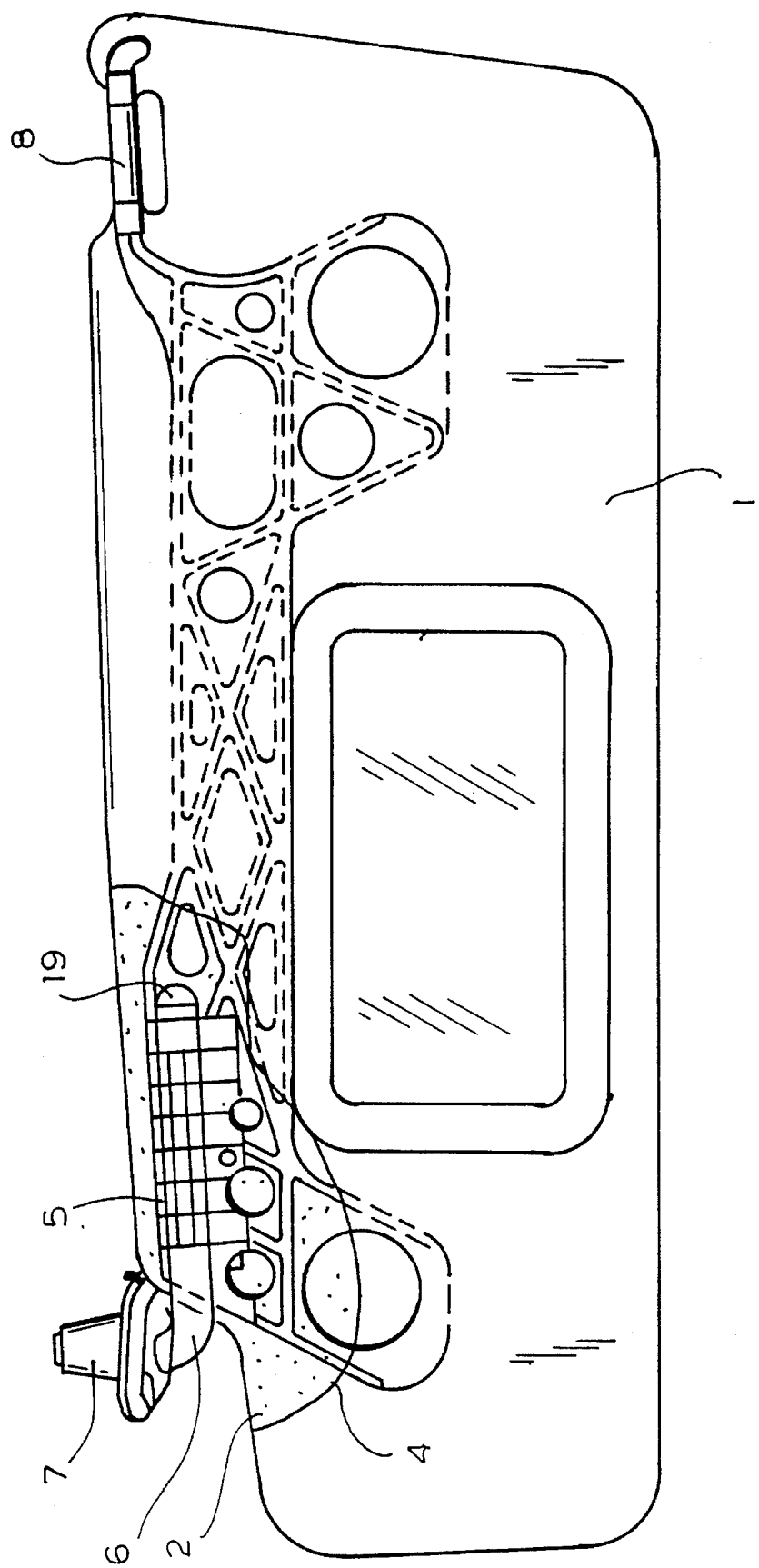
FIG. 1 shows a partially sectional view of a vehicle sun visor with a bearing device of the invention.

The sun visor of the invention comprises a sun visor body 1 with a core 2 made of expanded material, preferably expanded polypropylene, a reinforcement frame 3 embedded in the core 2 and an envelope 4, preferably of TPO film. To enable swiveling and a swingable mounting of the visor body on a vehicle body, not shown, there is a visor bearing shaft 6. One end section of the shaft is situated in a bearing body 5 in the sun visor body 1. The other end section of the shaft can be attached to the vehicle body with the help of a small block 7.

At the opposite end of the sun visor body 1 there is an end support axis pin 8 which serves for detachable and rotatable engagement with an end support block, not shown, attached to the vehicle body. The leg of the L-shaped shaft 6 that is received in the sun visor body 1 and the end support axis pin 8 are aligned along the upper edge of the sun visor body 1 and form the axis of swinging of the sun visor to the use position at the windshield and out of the non-use position near the headliner of the vehicle. The sun visor body 1 can also be swung against a side window by detaching the end support axis pin 8 from the end support block and swinging the visor around the leg of the shaft 6 carried in the small block 7 and into position against the side window.

The bearing body 5 is molded as a single piece with the reinforcement frame 3, as a plastic injection molding preferably made of polypropylene. The bearing body 5 in the area of a bearing bore 9 has the distinctive feature of being formed from two rows of ribs, wherein each row of ribs includes two or more approximately semicircularly shaped individual ribs 10. As shown in FIGS. 4–7, each rib includes a base portion so that it has the general shape of a hook. One row of ribs is to one side and the other row is to the other side of the bore 9 for the shaft 6. In the embodiment shown, each row of ribs preferably includes individual ribs 10. The individual ribs 10 of each row are positioned in a respective line, one next to the other, and are arranged and spaced with reference to one another in such a way that an individual rib 10 of each row of ribs fills a gap in the opposite row of ribs, as is shown in FIGS. 6 and 7. The individual ribs 10 encircle the bearing bore 9 which they form from the left and right respectively by more than 180°. However, the inner wall surfaces of the individual ribs 10 run out tangentially after exactly 180° as measured from the root of the ribs. This feature is provided for enabling trouble free demolding of the reinforcement frame 3 without a pusher. Beneath the bearing bore 9 there is a radially projecting, generally U-shaped enlargement 14 extending axially along the entire length of the bore and formed by the shapes of the ribs.

The reinforcement frame 3 which is in a single piece unit with the bearing body 5 extends along nearly the entire length of the sun visor body 1. They are embedded in the upper section of the visor body so as to provide torsional stiffness of the sun visor body 1 by means of molded ears 11. In addition, the end support axis pin 8 is also molded as a single piece on the reinforcement frame 3. In order to conserve materials at high stability and to achieve good anchoring in the core 2, the reinforcement frame 3 is formed with ribs 12 and openings 13.

The end section of the shaft 6 inserted in the bearing bore 9 of the bearing body 5 includes an axial groove 15 with closed ends and groove walls 16 which diverge outwardly. The length of the bearing groove 15 corresponds approximately to the length of the bearing body 5. The groove 15 is subdivided by a ridge 17 which extends along the length of the groove and merges with the ends thereof. The groove 15 accepts a spring 18 made of spring steel sheet as a long punched and embossed component. The spring has a U-shaped cross section with legs converging toward the free edges and backing on the groove walls and the base or web of the U is provided with a continuous axial bend which lends the base a ridge roof like shape fitting in the trough shaped radial enlargement 14 of the bearing bore 9 at the bearing body 5. The tension in the spring 18 increases the further it is pressed into the groove 15.

Figure 5:
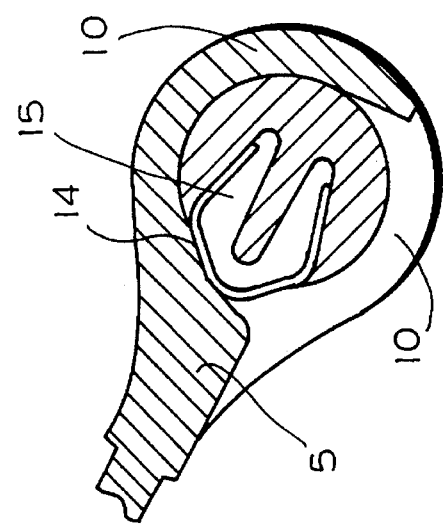
FIG. 5 shows section B—B indicated in FIG. 2 with the sun visor not positioned for use and/or in its detented position.
Figure 4:
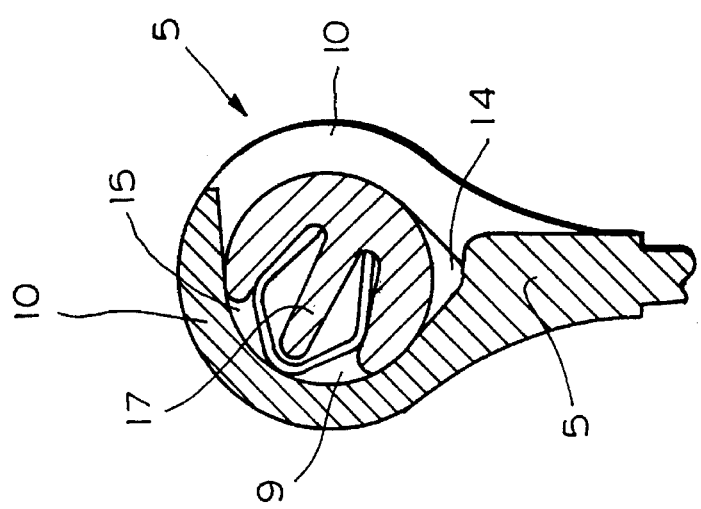
FIG. 4 shows section B—B indicated in FIG. 2 with the sun visor positioned for use.
Figure 3:
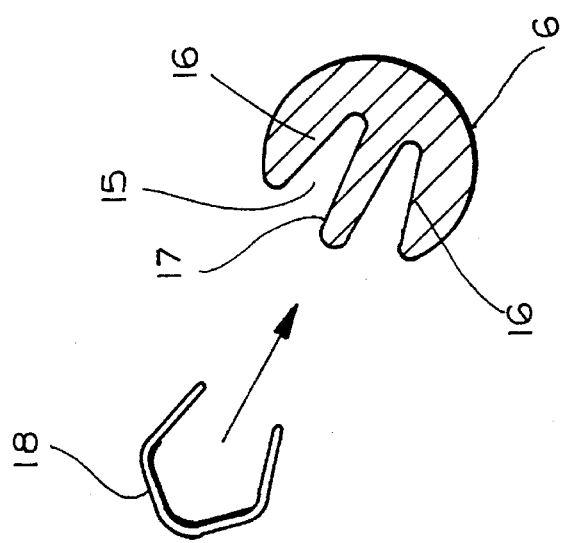
FIG. 3 shows section A—A indicated in FIG. 2.

FIG. 4 shows the situation where the spring 18 is backed by the ridge 17 within the swivel range of the sun visor body 1. FIG. 5 shows the spring 18 with the sun visor body 1 in the detent position in the enlargement 14 which is preferably identical with the non-use position of the sun visor body 1 at the headliner. The spring 18 creates a frictional force on the ribs which is sufficient to hold the sun visor body 1 in any swivel position.

The free end of the shaft 6 can be provided with a mushroom like thickening 19 to prevent its being unintentionally pulled out of the bearing body 5. The mushroom like head is to only make removal more difficult, but it is not large enough to prevent removal.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A bearing device for a pivotally mounted vehicle sun visor, wherein the sun visor includes a sun visor body;

the bearing device including, a bearing shaft having an end for supporting the visor body, a bearing body for inclusion in the sun visor body and around which the sun visor body can be swiveled between first and second positions; a plastic material reinforcement frame for inclusion in the sun visor body, and the bearing body being molded on the frame in the sun visor body;

the bearing body being shaped to define a bearing bore for receiving therein the end of the bearing shaft for supporting the sun visor, the bearing body comprising two rows of ribs for defining the bearing bore, wherein each row of ribs comprises at least two approximately semicircularly shaped individual ribs, and the ribs of each row being located in a line one next to the other and being spaced apart from each other defining gaps between adjacent ribs in the respective row, and the ribs of each row being so placed and shaped as to fill the gaps in the other row of ribs;

the bearing shaft being inserted in the bearing bore, the shaft including an axially extending groove therein and the groove including lateral groove walls in the bearing shaft for defining the groove;

a U-shaped spring including legs which extend into the groove walls and the legs contact the walls of the groove and the spring extends over the length of the groove and contacting the groove walls, the spring having a web and the spring being loaded such that the web of the spring is urged outwardly from the groove and against the interiors of the ribs, for controlling the swiveling of the shaft with reference to the ribs of the bearing body which the spring engages.

2. The bearing device of claim 1, wherein the ribs are so shaped and both rows of ribs are so positioned that they define a generally circularly shaped bore in which the bearing shaft is disposed.

3. The bearing device of claim 2, wherein the ribs are so shaped and placed that the ribs together define at least one radially enlarged, axially extending, generally U-shaped enlargement, such that when the shaft is rotated so that the spring is urged into the trough shaped enlargement, the bearing shaft is detented into the position defined by the location of the trough.

4. The bearing device of claim 3, wherein the walls of the groove in the shaft diverge outwardly in the radially outward direction and the legs of the spring are correspondingly oriented, whereby the spring is normally urged outwardly of the groove and into engagement with the ribs and the legs of the spring are correspondingly converged inwardly in the radially inward direction.

5. The bearing device of claim 1, wherein the walls of the groove in the shaft diverge outwardly in the radially outward direction and the legs of the spring are correspondingly oriented, whereby the spring is normally urged outwardly of the groove and into engagement with the ribs and the legs of the spring are correspondingly converged inwardly in the radially inward direction.

6. A sun visor comprising in combination, a bearing device and a sun visor body supported on and reinforced by the bearing device;

the bearing device including, a bearing shaft having an end for supporting the visor body, a bearing body for inclusion in the sun visor body and around which the sun visor body can be swiveled between first and second positions; a plastic material reinforcement frame for inclusion in the sun visor body, and the bearing body being molded on the frame in the sun visor body;

the bearing body being shaped to define a bearing bore for receiving therein the end of the bearing shaft for supporting the sun visor, the bearing body comprising two rows of ribs for defining the bearing bore, wherein each row of ribs comprises at least two approximately semicircularly shaped individual ribs, and the ribs of each row being located in a line one next to the other and being spaced apart from each other defining gaps between adjacent ribs in the respective row, and the ribs of each row being so placed and shaped as to fill the gaps in the other row of ribs;

the bearing shaft being inserted in the bearing bore the shaft including an axially extending groove therein and the groove including lateral groove walls in the bearing shaft defining the groove;

a U-shaped spring including legs which extend into the groove walls and the legs contact the walls of the groove and the spring extends over the length of the groove and contacting the groove walls, the spring having a web and the spring being loaded such that the web of the spring is urged outwardly from the groove and against the interiors of the ribs, for controlling the swiveling of the shaft with reference to the ribs of the bearing body which the spring engages;

the bearing body and the reinforcement frame being embedded in the sun visor body, and the reinforcement frame being shaped for stiffening the visor body against bending and torsion.

* * * * *